O. F. MORRILL.
Heating Apparatus.
No. 44,549.
Patented Oct. 4, 1864.
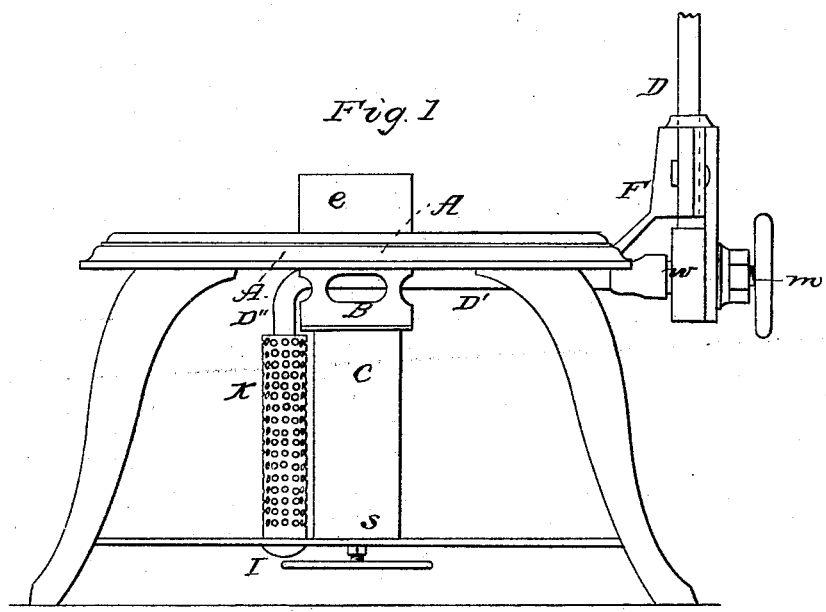
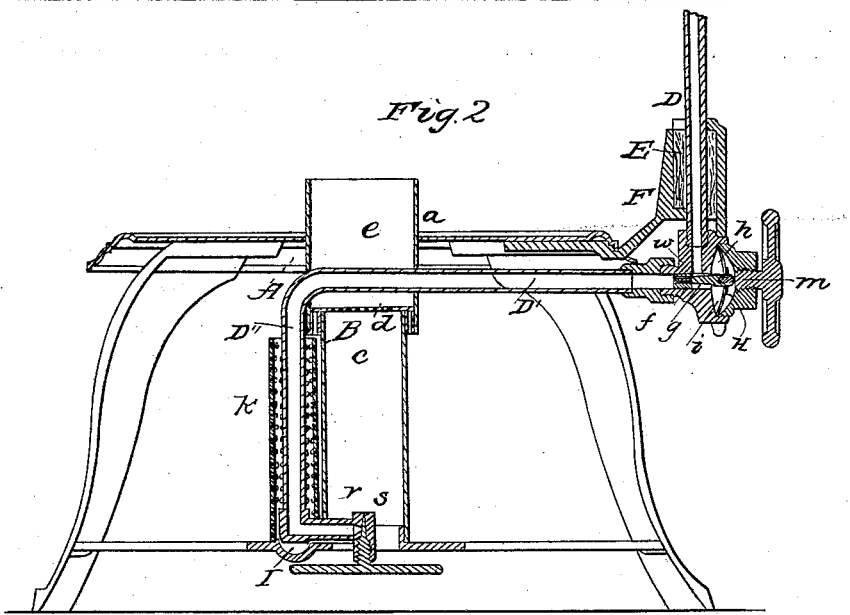

UNITED STATES PATENT OFFICE.

OSCAR F. MORRILL, OF CHELSEA, MASSACHUSETTS.

IMPROVED HEATING APPARATUS.

Specification forming part of Letters Patent No. 44,549, dated October 4, 1864.

*To all whom it may concern:*

Be it known that I, OSCAR F. MORRILL, of Chelsea, in the county of Suffolk and State of Massachusetts, have made a new and useful invention having reference to Apparatus for Generating Heat for Culinary or other Purposes; and I do hereby declare the same to be fully described in the following specification and represented in the accompanying drawings, of which—

Figure 1 is a side elevation, and Fig. 2 a vertical section, of a heat-generating apparatus embracing my invention, the nature of which consists, principally, in the combination of a foraminous air-disseminator, an internal column or a retort or vaporizer, and a heating-cup or its equivalent, whether the said cup or its equivalent be directly connected with or be separate from the column or vaporizer; and my invention also consists in the application or arrangement of the heating cup whereby it becomes so insulated from the part to be heated by it as to prevent the heat from such part being conducted into the combustible liquid contained in the cup.

An apparatus to which my invention is particularly applicable may be thus described.

In the drawings, A denotes a stand, and B an aerovapor-burner arranged therein, the said burner being composed not only of a tube, *c*, (open at its lower end,) but of a foraminous plate or wire-gauze diaphragm, *d*, over which there is a perforated chimney, *e*, which extends upward through and concentrically with respect to the tablet *a* of the stand A.

D is a conduit or hollow column or pipe, which may be supposed to lead downward from the bottom of a reservoir or vessel for holding petroleum, naphtha, or carbon-spirits, or any other liquid easily vaporizable and combustible. The said pipe or conduit D leads through an insulator or block of wood, E, held in place within and by an arm, F, projecting from the frame A. The conduit D opens into the elbow-joint *w* of another conduit or pipe, D', which passes along underneath the tablet *a* and goes through the chimney *e* and directly over the burner B, and thence downward, as shown at D", and subsequently is turned horizontally into the burner, where it is provided with a jet-tube, *s*, which is furnished with an adjustable valve, *r*, the whole being as represented in Fig. 2.

Within the elbow-joint there is a valve-seat, *f*, which has a valve, *g*, formed on a rod, *h*, which projects from a spring-diaphragm, *i*. A screw, *m*, serves to move the valve toward and against the seat. The diaphragm which is extended across a concavo-convex disk, H, operates to press the valve away from its seat.

My invention, which is specially applicable to such apparatus, is for the purpose of heating that part of the conduit which runs down alongside of the burner, such conduit being usually termed the "vaporizer." The object of heating such part (marked D" in Fig. 2) is to vaporize the liquid hydrocarbon therein sufficiently for setting the aerovapor-burner in action, the flame generated by such burner afterward sufficing to heat the vaporizer for the production of the elastic combustible vapor required to keep the burner in operation.

In carrying out my invention I place underneath the part D" of the vaporizer a cup, I, so insulated from the conduit D" as not to touch it, such cup being supported by or formed in the stand A. From this cup, and surrounding the part D" concentrically, I extend upward a chimney or air-disseminator, K, open at top, and having its sides foraminous or provided with numerous small holes or orifices, through which air can rush into the interior of the disseminator while there may be a flame therein.

When using the cup I and the air-disseminator K, the cup is to contain a small amount of combustible liquid capable of being inflamed. While the liquid is inflamed numerous small currents of air will rush through the openings of the sides of the disseminator and combine with the flame of the liquid and either destroy or materially impair its illuminating qualities and greatly increase its heating power. The inflamed mixture of air and vapor will operate with great effect in heating the conduit.

In this application of a cup or burner and a foraminous chimney or air-disseminator to the tubular conduit I have made the discovery that a non-foraminous column extending up through a foraminous air-disseminator and from over a cup or burner is productive of another highly valuable and useful effect, viz., that it contributes to spread the flame into a hollow, cylindrical, or tubular form and present it to better advantage to the inrushing currents of air than would be the case were the burner and air-disseminator used alone or without such column going up through the latter.

I would remark that I do not confine my invention to the above-described form and construction of the disseminator, as they may be somewhat varied without materially changing its operative power, either of supplying air to the flame in such manner as to increase the heating power of the flame and reduce its illuminating power or of forcing the flame into close contact with the column or conduit. Furthermore, I would state that by having the cup I insulated from the vaporizer or conduit D'', and furnished with the air-disseminator K, raised on the cup, I not only prevent the conduit from heating the cup or its liquid contents, but the disseminator serves to convey away from the cup most of the heat which it may absorb from the flame. So by having the cup made in the stand A or supported directly by it the latter serves to conduct off much of the heat of the cup and thereby prevent the liquid of the cup from being too freely vaporized.

I am aware that for the purpose of vaporizing a combustible liquid a cup or trough to surround and be directly attached to a tube or vaporizer, and to hold a combustible liquid, has been employed before my invention, and therefore such cup or trough or such application and use of it I do not claim.

What I do claim as my invention is as follows:

1. The combination of the air-disseminator K and the cup I or its equivalent with the conduit, retort, or vaporizer D'', when combined with or making part of an aerovapor heating apparatus, as described, or its equivalent.

2. The combination of the air-disseminator or chimney K and the cup I or its equivalent with a column, D'', extending through the disseminator and over the cup or burner, and for the purpose of spreading the flame of the cup or burner within the disseminator, in manner as specified.

3. The heating-cup I and the air-disseminator K, combined with the retort or vaporizer D'' in such manner that such cup may be separated or insulated from such retort, conduit, or vaporizer, substantially as and for the purpose as specified.

4. The combination of the cup I with the stand A of the heating apparatus substantially in manner as described.

OSCAR F. MORRILL.

Witnesses:
R. H. EDDY,
F. P. HALE, Jr.